United States Patent [19]

Moseley, Jr. et al.

[11] 3,894,562

[45] July 15, 1975

[54] FLUID FLOW CONTROLLER

[76] Inventors: Charles D. Moseley, Jr., P.O. Box 449, Lynchburg, Va. 24503; Hal L. Moses, Rt. 1, P.O. Box 78, Newport, Va. 24128

[22] Filed: Dec. 20, 1973

[21] Appl. No.: 426,570

[52] U.S. Cl............................ 138/44; 73/213
[51] Int. Cl............................. F15d 1/02
[58] Field of Search .............. 138/44, 40, 39, 42; 73/213

[56] References Cited
UNITED STATES PATENTS

| | | | |
|---|---|---|---|
| 1,850,030 | 3/1932 | Pardoe | 138/44 |
| 2,868,013 | 1/1959 | Terrell | 138/44 |
| 3,774,645 | 11/1973 | Pompa | 138/44 |

OTHER PUBLICATIONS
"Chaleur & Industrie," No. 393, April 1958.

Primary Examiner—Henry K. Artis
Assistant Examiner—James E. Bryant, III

[57] ABSTRACT

A device is disclosed which is capable of being inserted in a liquid carrying pipe line for limiting the flow of the liquid to a predetermined rate. The device comprises a housing having a bore extending from an inlet opening to an outlet opening. The bore is divided into three chambers, a convergent chamber, a cavitation chamber, and a diffusing chamber. The shape of the cavitation chamber is such that cavitation of the liquid passing therethrough occurs when the pressure of the liquid entering the inlet opening reaches a predetermined amount. Such cavitation limits the flow rate of liquid through the outlet opening irrespective of an increase in the pressure of the liquid at the inlet opening above the predetermined amount. The diffusing chamber is also shaped to dissipate the cavitation in an area away from the inside surface of the connecting pipe to prevent destruction thereof by the cavitation.

5 Claims, 9 Drawing Figures

CONVENTIONAL NOZZLE

FLUID FLOW CONTROLLER

FLUID FLOW CONTROLLER

BACKGROUND OF THE INVENTION

This invention relates to liquid flow control devices and more particularly to a device which utilizes the phenomena of cavitation to maintain the flow rate of a liquid constant regardless of pressure increases or fluctuations of the liquid entering the device.

DESCRIPTION OF THE PRIOR ART

The phenomenon of cavitation in liquids flowing under pressure through a constriction has been known for some time. The destructive effects of cavitation in the form of erosion, pitting and facturing of piping and fittings in liquid handling systems are a constant problem to designers of such systems. Because of its destructive effects as aforementioned, the phenomenon of cavitation heretofore has been something designers strive to eliminate.

Applicants on the other hand have recognized the enormous potential of the cavitation phenomenon particularly with regard to its utilization in devices for controlling the flow rate of liquids and have devised a means for eliminating the aforementioned destructive effects thereof. Applicants are unaware of any device in the prior art which utilizes the phenomenon of cavitation for maintaining the flow rate of a liquid at a predetermined constant amount regardless of the fluctuations or increases in the pressure of the liquid. Prior art devices for maintaining the flow rate of a liquid constant are normally constructed of numerous moving parts which require cleaning, maintenance and adjustment. Because of their complexity, the prior art devices are very costly and are suitable for use only where the fluctuation in pressure on the fluid is relatively small.

It is therefore the primary object of the present invention to provide a device for maintaining the rate of flow of a liquid through the device essentially constant regardless of the amount of an increase in or fluctuation of the pressures of the liquid above the initial amount.

It is another object of the invention to provide such a liquid flow control device which is practically impervious to the temperature of the fluid passing through it, has no moving parts, requires no cleaning or adjusting.

It is a further object of the invention to provide a liquid flow control device which utilizes the phenomenon of cavitation to limit the flow rate of a liquid in a piping system with no destructive effect thereto resulting from said cavitation.

It is a still further object of the invention to provide such a flow control device which is inexpensive to manufacture and which is easily installed in conventional piping systems.

It is yet a further object to provide such a flow control device which is capable of operating effectively at any temperature above the freezing point of the liquid and below its boiling point.

These and other objects will become apparent from a reading of the following description taken in conjunction with the annexed drawings.

SUMMARY OF THE INVENTION

The present invention is a device for controlling the flow of liquids to plumbing fixtures, heating and cooling equipment, or in any piping system where it is desired to limit the flow rate of a liquid to a predetermined amount. The device will permit liquid to flow through it at a constant rate for a given pressure and once that pressure is reached no further appreciable increase in the flow rate will result regardless of any additional pressure applied to the liquid. The device has been found to maintain the flow rate essentially constant for liquids flowing under pressures of between 20 pounds per square inch to those equal to the burst limits of the piping system in which it is installed.

The device comprises a one piece housing having a bore extending from an inlet opening to an outlet opening. The inlet and outlet openings are positioned in the path of the liquid to be controlled. The bore further comprises three serially connected chambers, a convergent chamber, a cavitation chamber, and a diffusing chamber. As the liquid under pressure passes from the inlet opening through the convergent chamber, its velocity is substantially increased and its pressure reduced. The rapidly moving liquid passes through the cavitation chamber where its velocity is reduced and its pressure increased to that existing at the inlet. The flow rate of liquid into the inlet will be the same as the flow rate of liquid discharged at the outlet according to the Continuity Equation. The cavitation chamber is a specifically designed constriction which will permit the liquid flowing through it to cavitate when the liquid reaches a certain velocity.

The phenomenon of cavitation will be described in greater detail later and it is sufficient to say at this point that once cavitation in a liquid flowing through a constriction commences, further increase in the flow rate of the liquid past the cavitation point stops regardless of an increase in the pressure on the liquid required to initiate cavitation.

Before the phenomenon of cavitation can be practically utilized in controlling the flow rate of a liquid, it is necessary to eliminate the aforementioned destructive effects of such cavitation after the cavitating liquid leaves the cavitation chamber and enters the diffusing chamber and from there to the piping connected to the outlet of the device. Applicants' novel design of the diffusing chamber does in fact eliminate these destructive effects of cavitation by ensuring that the cavities completely dissipate before exiting the diffusing chamber and harmlessly away from the walls of the pipe or accompanying fittings.

DETAILED DESCRIPTION OF THE PREFERRED EMBODIMENTS

Figure 1:
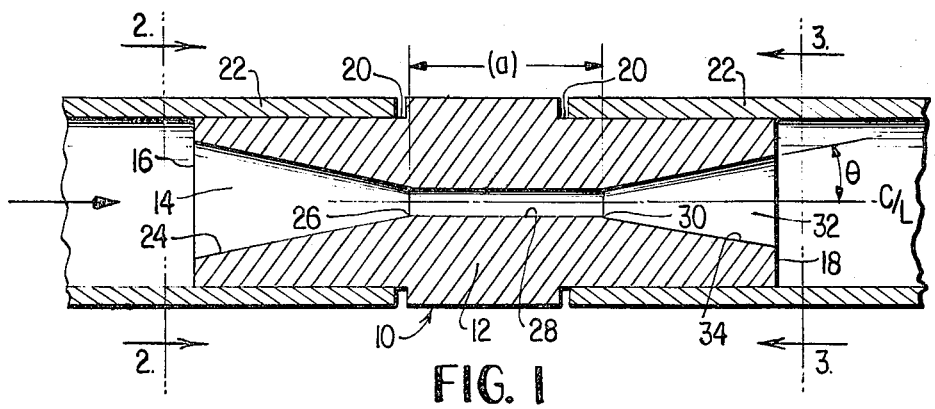
FIG. 1 is a view in cross-section of the flow fluid flow controller of the present invention.
Figure 2:
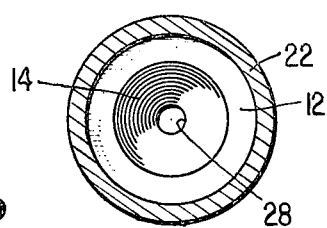
FIG. 2 is a cross-sectional view taken along lines 2—2 of FIG. 1.
Figure 3:
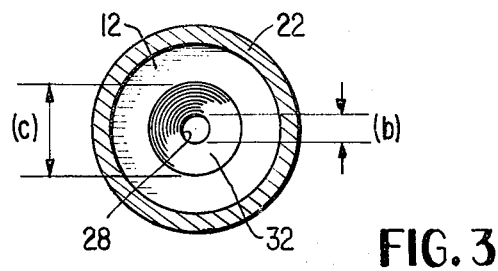
FIG. 3 is a cross-sectional view taken along lines 3—3 of FIG. 1.

Referring now to the drawings, FIGS. 1 through 3 show the flow controller of the present invention indicated generally by the numeral 10. Flow controller 10 consists of a one piece, solid housing 12 made of brass, stainless steel, plastic or other suitable material depending on the nature of the liquid to be controlled. The housing 12 has a hollow, continuous passageway or bore 14 extending from an inlet opening 16 to an outlet opening 18. A recess 20 is provided on the outer surface of both ends of the housing 12, the diameter of which is slightly smaller than the internal diameter of the pipe line 22 carrying the liquid. In the embodiment of FIG. 1, the housing 12 would be sweated by conventional means between the pipe 22, however, it is to be understood that the recess could contain threads or the like which sealingly engage mating threads on the ends of the pipe 22.

The bore comprises a convergent chamber 24 in the shape of a hollow, truncated cone which tapers from the inlet opening 16 down to one end 26 of a throat or cavitation chamber 28. The angle of taper of the convergent chamber 24 with respect to the centerline of the cavitation chamber 28 is not critical and is normally in the range of between 20 and 30°. The cavitation chamber 28 is in the shape of a hollow cylinder having continuous side walls extending at a constant radius from the centerline of the chamber. The length of the cavitation chamber 28 indicated by the letter ($a$) is critical as will be described in greater detail later. The other end 30 of the cavitation chamber 28 opens into a diffusing chamber 32 which is also in the shape of a hollow, truncated cone. The sides 34 of the diffusing chamber 32 taper away from the other end 30 of the cavitation chamber 28 toward the outlet opening 18 at a specific angle $\theta$ with respect to the centerline of the cavitation chamber 30. The amount of angle $\theta$ in degrees as well as the ratio of the diameter of the outlet opening 18 to the diameter of the cavitation chamber 30 will also be described in detail later.

As is well known, the rate of an incompressible liquid flowing through an outlet such as a pipe, nozzle orifice or the like in terms of the volume thereof per unit of time is a function of the velocity of the liquid and the diameter of the outlet. According to the Continuity Equation: "The mass rate of liquid flow into any fixed space is equal to the mass rate of liquid flow out." If the pressure on a liquid is increased, the flow rate of liquid through an outlet will also increase. Thus, in order to maintain the flow rate of a liquid under a specific pressure constant through an opening despite an increase in the pressure on the liquid, flow control devices of the prior art had means for correspondingly reducing the size of the opening.

Applicants' device on the other hand does not rely on any such mechanical means for reducing the size of the outlet opening to maintain the flow rate of the liquid under a specific pressure constant despite increases in the pressure but instead relies on the phenomena of cavitation. Cavitation occurs in a liquid when the absolute pressure of the liquid drops to its vapor pressure. If the liquid is in contact with a boundary wall or opening when cavitation commences, the liquid will normally separate itself from the boundary wall producing a cavity in which the mean pressure is the vapor pressure of the liquid. Once cavitation of a liquid commences at an opening, no further increase in the flow rate of the liquid is possible past the opening regardless of an increase in the pressure on the liquid above that present at the beginning of cavitation.

If the opening is the orifice of a nozzle such as the convergent chamber 24 of applicants' device, the rate of flow of liquid out of the orifice on one end 26 will be a function of the velocity of the liquid and the diameter of the orifice 26 as aforementioned for a specific pressure on the liquid. It is well known that the velocity of a liquid increases at each point of its passage through a nozzle. If the pressure on the liquid entering the inlet 16 (see arrow in FIG. 1) is increased above the specific pressure, the velocity of the liquid leaving the orifice 26 will also increase proportionally. As the pressure and velocity continue to increase, the local or absolute pressure of the liquid flowing through the orifice 26 falls to the vapor of the liquid causing the inception of cavitation. By choosing an orifice diameter which will give the desired flow rate of liquid when the pressure on the liquid, and thus its velocity, is close to that required to initiate cavitation, only a slight increase in pressure will thus be required to initiate cavitation in the orifice 26 and thus block further increases in the flow rate regardless of the amount of pressure increase above the specific amount. The inception point of cavitation may vary depending on the temperature of the liquid to be controlled. If the liquid is viscous such as, for example, oil, an increase in temperature will tend to permit the liquid to flow more easily due to reduced friction between the layers of the liquid as well as between the liquid and its boundaries. This will increase the velocity of the liquid flowing from the orifice 26 for a given pressure and thus the point at which cavitation commences. The converse is also true with regard to a reduction in temperature. If the liquid is water, little or no effect will be noticed if the temperature of the liquid is varied between just above freezing and just below boiling because the viscosity of water remains substantially the same in this temperature range.

The cavitation chamber 28 is in effect a short tube orifice whose length is critical to the efficient operation of the device. If the cavitation chamber 28 had no lengthwise dimension ($a$), cavitation would commence at the point where the diffusing chamber 32 begins to taper away toward the outlet opening 18 and an undesirable pulsating action would ensue in the diffusing chamber 32. This pulsating action would cause the flow rate of liquid at the outlet opening 18 to fluctuate. In contrast, applicants have discovered that by inserting a short tube orifice as the cavitation chamber 28 having a lengthwise dimension ($a$) which is at least approximately the same as the diameter ($b$) of the orifice, cavitation is caused to exist throughout the entire length ($a$) and the aforementioned undesirable pulsating action is effectively eliminated resulting in an even, non-fluctuating flow rate of fluid at the outlet opening 18.

As aforementioned, the sides 34 of the diffusing chamber 32 taper away from the other end 30 of the cavitation chamber 28 toward the outlet opening 18 a specific distance at a specific angle $\theta$ with respect to a line through the center of rotation of the cavitation chamber 30. Applicants have found that if the angle $\theta$ is relatively small and the tapered side 34 of the diffusing chamber a certain length, the cavities formed in the cavitation chamber 30 will stay adjacent the sides 34 of the diffusing chamber 32 and dissipate harmlessly therein before exiting the outlet opening 18. An angle θ of approximately four degrees was found to be preferred to keep the cavities formed in the cavitation chamber 30 adjacent to the tapering wall 34 of the diffusing chamber 32 if the diameter (c) of the outlet opening 18 is kept at approximately one and one-half times the diameter (b) of the cavitation chamber (b). If the angle θ is increased to as much as 10° or the length of the tapered side not proportional as aforementioned, the cavities tend to separate themselves from the tapered side 34 of the diffusing chamber 32 and exit the outlet opening 18 whereupon they may dissipate adjacent the internal walls of pipe 22 and cause damage thereto as will be subsequently described with reference to FIGS. 4 and 5.

An example of a fluid flow device for maintaining a flow rate of approximately three gallons of liquid per minute would have a cavitation chamber (a) 0.100 inches in length, a diameter (b) of 0.100 inches, an outlet opening 18 of 0.150 inches and an angle θ of 4° at a pressure on the liquid entering the inlet opening 16 of approximately 40 pounds per square inch. As stated previously, the angle θ of taper and length of the sides of the convergent chamber 24 is not critical and can therefor, in fact, be identical to that of the diffusing chamber 32.

By so making the dimensions and shape of the convergent and divergent chambers identical, the position of the device in a pipe line or the like would not make any difference to the operation of the device and would thereby eliminate the possibility of installing the device incorrectly or backwards.

Figure 4:
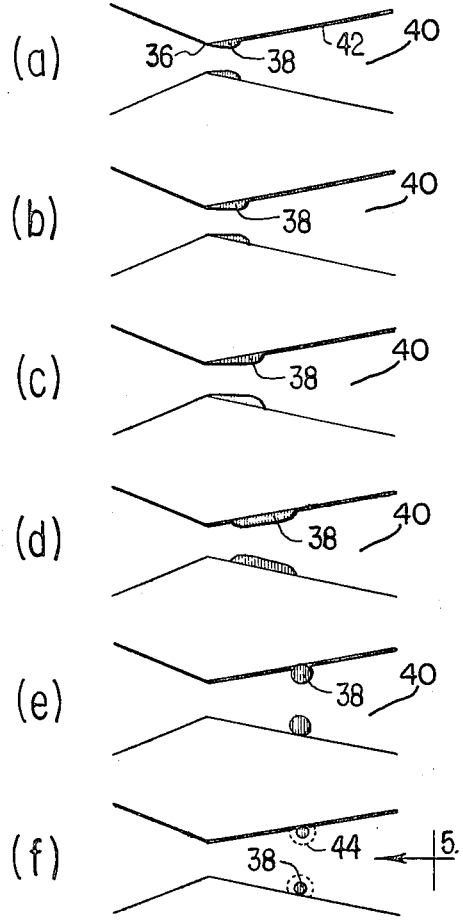
FIGS. 4 (a–f) are a schematic representation of the cavitation phenomenon in a conventional nozzle.
Figure 6:
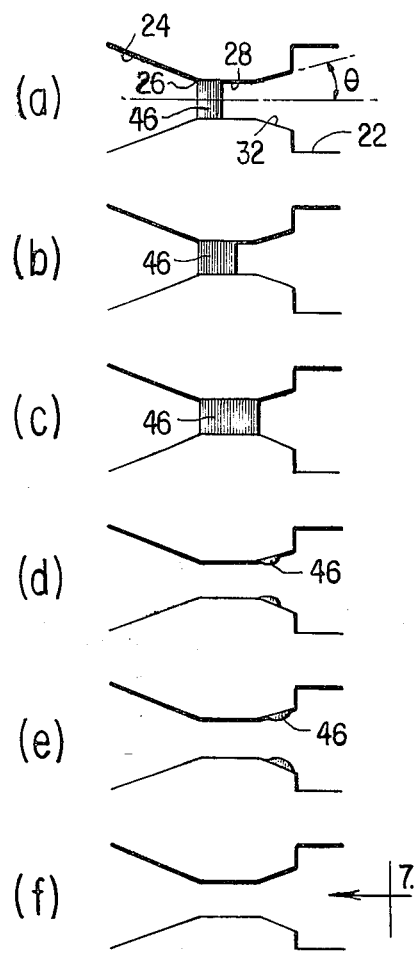
FIGS. 6 (a–f) are a schematic representation of the cavitation phenomenon in the flow controller of the present invention.
Figure 5:
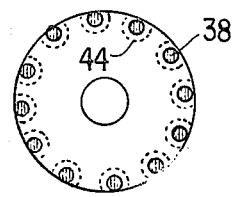
FIG. 5 is an enlarged end view of the nozzle taken along the lines 5—5 of FIG. 4 (f).
Figure 7:
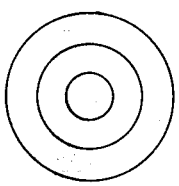
FIG. 7 is an enlarged end view of the flow controller taken along the lines 6—6 of FIG. 6 (f).

FIGS. 4 (a–f) and 5 show a schematic drawing of a conventional constriction illustrating the formation and disappearance of a single cavity. The nature and location of the destructive effects caused by cavitation is also shown. FIGS. 6 (a–f) and 7 show a schematic drawing of the flow control device of the present invention also illustrating the formation and disappearance of a single cavity and have, as a result of applicants' unique diffusing chamber, eliminated the destructive effects caused by cavitation. Referring first to FIGS. 4 and 5, liquid flows through the constriction 36 in the direction of the arrow. When the velocity of the liquid is such that the local pressure at the constriction 36 reaches the vapor pressure of the liquid, cavitation commences. A cavity 38 is formed having a low internal pressure adjacent the constriction 36. Shown in FIG. 4(a). The cavity 38 is swept downstream as shown in FIGS. 4(b–d) into a region 40 of high pressure. When the cavity 38 reaches the region of high pressure 40 it collapses suddenly as the surrounding high pressure liquid rushes in to fill the void. At the point of disappearance of the cavity 38 the in rushing liquid comes together momentarily raising the local pressure within the liquid to a very high value. Because the cavity 38 is in contact with the boundary wall 42, the wall 42 receives a blow as from a tiny hammer. If the blows continue the wall may be damaged as shown by the pitting 44 in FIGS. 4 (f) and 5 or it may be stressed beyond its elastic limit resulting in fatigue and destruction of the wall material. The precise nature of an ideal flow of a liquid through a constrictive such as 36 is set forth in the book, "Elementary Fluid Mechanics," by John K. Vannard, Appendix VII, Cavitation, pages 554–556.

In contrast, as shown in FIGS. 6 (a–f) and 7, applicants' constriction is an elongated, cylindrical-shaped chamber or short tube orifice 28. The cavity 46 formed at the entrance 26 rapidly fills the entire area of chamber 28 as shown in FIGS. 6 (a–c). The cavity 46 then adheres to the tapered side wall of the divergent chamber 32 as shown in FIGS. 6 (d, e).

The cavity 46 dissipates into the stream of liquid before it reaches the outlet opening as seen in FIGS. 6 (f) and 7 thus eliminating any possibility of the aforementioned stress, pitting and eventual destruction of the internal walls of the pipe 22.

Figure 8:
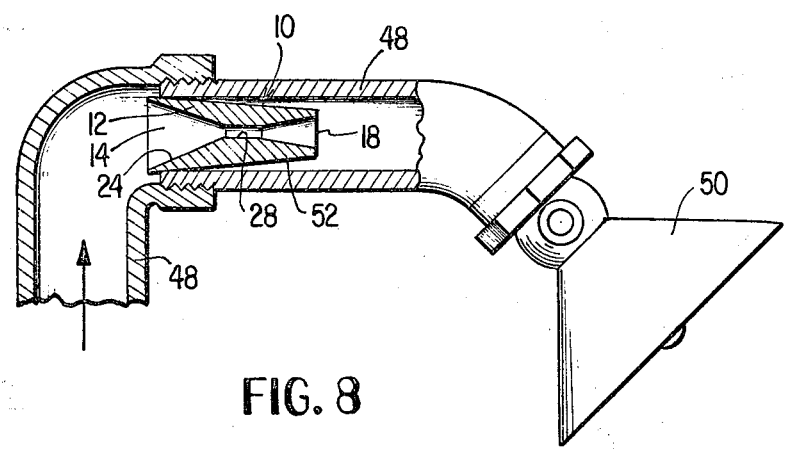
FIG. 8 is a cross-sectional view of the flow controller of the present invention installed in the supply pipe to a conventional shower head.

FIG. 8 shows the fluid flow controller of the present invention installed in the water supply line 48 to a conventional shower head 50. The device is positioned with the outlet 18 facing the shower head 50. The outer surface 52 of the housing 12 is also tapered downwardly in the direction of the shower head 50 from a diameter which is slightly larger than the internal diameter of the pipe 48. The pressure of the liquid or water exerted against the walls of the convergent chamber 24 forces the tapered outer surface 52 into frictional, watertight engagement with the internal surface of the pipe 48 to insure that all of the water indicated by the arrow in FIG. 8 passes through the bore 14 of the device. The installation of the device of the present invention in the supply pipe 48 proximate to a conventional shower head 50 will result in a significant saving of water by maintaining the flow rate of water from the nozzle at a predetermined constant amount regardless of the degree of which the values (not shown) controlling the hot and cold water to the device are opened above the amount necessary to start cavitation in the cavitation chamber 28.

Figure 9:
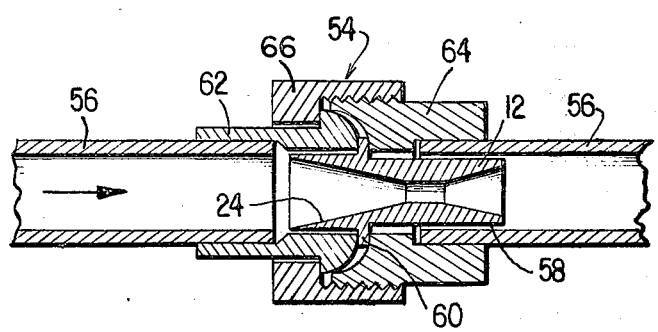
FIG. 9 is a cross-sectional view of the flow controller of the present invention installed in a conventional pipe union.

FIG. 9 shows another embodiment of the fluid flow controller 10 of the present invention capable of being inserted in a conventional pipe union 54 connecting two sections of pipe 56. The outer surface 58 of the housing 12 has a radially extending lip 60 which is positioned between the first and second sections 62, 64 of the union 54 and is held in watertight sealing engagement with the sections 62, 64 by means of the lock nut 66. The fluid controller 10 is installed with the convergent chamber 24 pointing in the direction of fluid flow shown by the arrow in FIG. 9.

The outer surface of the housing of the device can be shaped to enable it to be installed in any plumbing fitting to thereby limit the flow rate of a liquid in the pipe line connected to the fitting or to any piece of equipment or the like to which the liquid is being supplied.

Having illustrated and described embodiments of this invention in some detail, it will be understood that these descriptions and illustrations have been offered by way of example only, and that the invention is to be limited in scope only by the appended claims.

What we claim is:

1. A device adapted to be inserted in a pipe line for limiting the flow of a liquid through said pipe line to a predetermined rate, said device comprising:
   a. a housing having a bore extending from an inlet opening to an outlet opening, said bore having a convergent chamber, a cavitation chamber, and a diffusing chamber, said convergent chamber tapering from said inlet opening to one end of said cavitation chamber and said diffusing chamber tapering away from said cavitation chamber to said outlet opening, said cavitation chamber being cylindrical in shape and having a length approximately equal to the diameter thereof such that cavitation of said liquid occurs throughout said cavitation chamber when the pressure of said liquid entering said inlet opening reaches a predetermined amount to thereby limit the rate of flow of said fluid through said outlet opening irrespective of an increase in the pressure of said fluid at said inlet opening above said predetermined amount, and b. the amount of taper of said diffusing chamber away from said cavitation chamber is at most ten degrees with respect to the axis of rotation of said diffusing chamber to thereby insure dissipation of the cavities formed in said fluid before said cavitating fluid exits said outlet opening.

2. A device as set forth in claim 1 wherein the length of said cylindrical cavitation chamber is at least the same as the diameter thereof.

3. A device as set forth in claim 1 wherein said convergent and diffusing chambers are hollow, truncated cones, the largest diameters of said cones forming said inlet and outlet openings, the smallest diameters of which are equal to the diameter of said cavitation chamber, and the largest diameter of said diffusing chamber cone being approximately one and one-half times as great as the smallest diameter thereof.

4. A device as set forth in claim 1 wherein said diffusing chamber cone tapers away from said cylindrical cavitation chamber at an angle of four degrees with respect to the axis of rotation of said diffusing chamber cone.

5. A device adapted to be inserted in a pipe line for limiting the flow of a liquid through said pipe line to a predetermined rate, said device comprising:

a. a housing having a bore extending from an inlet opening to an outlet opening, said bore having a convergent chamber in the shape of a hollow, truncated cone, a hollow cylindrical shaped cavitation chamber, and a diffusing chamber in the shape of a hollow, truncated cone, said convergent chamber tapering from said inlet opening to one end of said cavitation chamber and said diffusing chamber tapering away from said cavitation chamber to said outlet opening, said cavitation chamber having a length approximately equal to the diameter thereof such that cavitation of said liquid occurs throughout said cavitation chamber when the pressure of said liquid entering said inlet opening reaches a predetermined amount to thereby limit the rate of flow through said outlet opening irrespective of an increase in the pressure of said fluid at said inlet opening above said predetermined amount, and b. the amount of taper of said diffusing chamber away from said cavitation chamber is approximately four degrees with respect to the axis of rotation of said diffusing chamber, and the largest diameter of said diffusing chamber cone being approximately 1½ times as great as the smallest diameter thereof to thereby insure dissipation of the cavities formed in said fluid before said cavitating fluid exits said outlet opening.

* * * * *